(12) United States Patent
Chen et al.

(10) Patent No.: US 11,559,829 B2
(45) Date of Patent: Jan. 24, 2023

(54) METAL SHEET HAVING LOW FRICTION COEFFICIENT AND LOW WAVINESS

(71) Applicant: BAOSHAN IRON & STEEL CO., LTD., Shanghai (CN)

(72) Inventors: Xiaoming Chen, Shanghai (CN); Shanqing Li, Shanghai (CN); Jizhe Quan, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 327 days.

(21) Appl. No.: 16/635,850

(22) PCT Filed: Aug. 29, 2018

(86) PCT No.: PCT/CN2018/102932
§ 371 (c)(1),
(2) Date: Jan. 31, 2020

(87) PCT Pub. No.: WO2019/042313
PCT Pub. Date: Mar. 7, 2019

(65) Prior Publication Data
US 2020/0368798 A1    Nov. 26, 2020

(30) Foreign Application Priority Data

Aug. 29, 2017 (CN) .......................... 201710758710.4

(51) Int. Cl.
*B21B 1/26* (2006.01)
*B21B 1/22* (2006.01)
(Continued)

(52) U.S. Cl.
CPC ................ *B21B 1/26* (2013.01); *B21B 1/227* (2013.01); *B32B 3/28* (2013.01); *B32B 3/30* (2013.01);
(Continued)

(58) Field of Classification Search
CPC ....... B21B 1/26; B21B 1/227; B21B 2261/14; F16S 1/04; F16S 1/00; F16S 1/06;
(Continued)

(56) References Cited

U.S. PATENT DOCUMENTS 3,754,873 A    8/1973 Bills et al.

FOREIGN PATENT DOCUMENTS

CA    2022235    *    2/1991
CN    1087846 A    6/1994
(Continued)

OTHER PUBLICATIONS

Notice of Reasons for Refusal for related JP App No. 2020-505155 dated Jan. 26, 2021, 8 pgs.
(Continued)

*Primary Examiner* — Michael E. La Villa
(74) *Attorney, Agent, or Firm* — Procopio, Cory, Hargreaves & Savitch LLP

(57) ABSTRACT

A metal sheet having a low friction coefficient and a low waviness. Multiple round or roughly-round small pits are distributed on the surface of the metal sheet. The diameter of a single pit ranges from 30 μm to 150 μm, and the overlap between adjacent pits is lower than 10%. On the surface of the metal sheet where the pits are located, the proportion of the area of pits per square millimeter of surface area is greater than 30%, and the difference between the quantities of pits in any unit square millimeter is less than 20%. By means of the proper design of surface microstructure, the friction coefficient and the waviness can be effectively reduced, thereby improving the forming and painting performance of the material.

6 Claims, 5 Drawing Sheets

(51) Int. Cl.
  *F16S 1/00*   (2006.01)
  *B32B 3/00*   (2006.01)
  *B32B 3/30*   (2006.01)
  *F16S 1/04*   (2006.01)
  *B32B 3/28*   (2006.01)
  *F16S 1/06*   (2006.01)

(52) U.S. Cl.
  CPC . *F16S 1/00* (2013.01); *F16S 1/04* (2013.01); *F16S 1/06* (2013.01); *B21B 2261/14* (2013.01); *Y10T 428/12993* (2015.01); *Y10T 428/24942* (2015.01); *Y10T 428/249921* (2015.04)

(58) Field of Classification Search
  CPC ..... Y10T 428/12993; Y10T 428/24942; Y10T 428/249921; B32B 3/28; B32B 3/30
  See application file for complete search history.

(56) References Cited

FOREIGN PATENT DOCUMENTS

| | | | |
|---|---|---|---|
| CN | 2183225 | Y | 11/1994 |
| CN | 2344106 | Y | 10/1999 |
| CN | 104726813 | A | 6/2015 |
| CN | 104884180 | A | 9/2015 |
| CN | 103769431 | A | 5/2017 |
| EP | 0412073 | A1 | 2/1991 |
| EP | 0685275 | A1 | 12/1995 |
| JP | H05269505 | A | 10/1993 |
| KR | 970000371 | A | 1/1997 |
| KR | 2012-0032992 | A | 4/2012 |

OTHER PUBLICATIONS

Office Action for related KR App No. 10-2019-7036036 dated Dec. 24, 2020, 9 pgs.
Office Action for related EP App No. 18850306.4, 2 pgs.
Supplementary European Search Report for related EP App No. 18850306 dated Apr. 29, 2021, 2 pgs.
First Office Action for related CN App No. 201710758710.4, 7 pgs.
First Search for related CN App No. 201710758710.4, 1 pg.
International Search Report for related International Application No. PCT/CN2018/102932, dated Oct. 29, 2018; English translation provided (4 pages).

\* cited by examiner

METAL SHEET HAVING LOW FRICTION COEFFICIENT AND LOW WAVINESS

CROSS-REFERENCE TO RELATED APPLICATIONS

This application is a U.S. National Stage entry of PCT Application No: PCT/CN2018/102932 filed Aug. 29, 2018, which claims priority to Chinese Patent Application No. 201710758710.4, filed on Aug. 29, 2017, the contents of which are incorporated herein by reference.

TECHNICAL FIELD

The present invention relates to a metal sheet, particularly to a metal sheet having a low friction coefficient and a low waviness.

BACKGROUND ART

In the stamping forming process of a metal sheet material, the frictional properties between the material and the mold significantly affect the metal flow of the material during the forming process, and further affect the stamping forming properties of the material. In order to reduce the friction between the material and the mold, in addition to applying some lubricating coatings on the surface of the material, making the surface of the material have a certain roughness can also effectively improve the friction properties between the material and the mold. The principle is that the surface microstructure of the material allows the storage of lubricating oil, so that a layer of oil film can be maintained at the contact interface between the mold and the material to improve the lubrication effect in the stamping forming process. Therefore, in order to obtain a good lubricating effect, it is required that the surface of the material have a relatively suitable microstructure, which allows a good storage of lubricating oil and ensures a relatively stable oil film during the stamping forming process.

When painting is conducted on the surface of the material, the surface microstructure of the material will affect the painting performance. In particular, due to the limited ability of the paint film to cover the microscopic uneven surfaces of the material, the microstructure, particularly the waviness of the surface of the material, will be transferred to the surface after painting. Therefore, in order to obtain a good surface after painting, it is usually required that the waviness of the material surface be as low as possible.

Chinese patent document titled "Production Method for Automobile Exterior Board" (Publication No. CN103769431A, Publication date: May 7, 2014) disclosed a production method for automobile exterior board. The technical solution disclosed in this patent document mainly relates to a production method for manufacturing a hot-dip galvanized automobile exterior board with low-waviness. By adjusting the roughness of the rolls in different processes, the roughness of the surface of the steel plate in each process is reasonably controlled, which ultimately ensures that the finished steel plate has a low waviness while having a certain roughness. However, the technical solution disclosed in this patent document mainly optimizes and improves the roll arrangement technique in the rolling leveling process so as to achieve the purpose of improving the coating effect of the steel plate surface, and does not involve specific optimization and improvement of the microscopic surface structure.

Chinese patent document titled "Flat Products Made of Metal sheet, in Particular a Steel Material, Use of Such Flat Products, and Roll and Method for Producing Such Flat Products" (Publication No. CN104884180A, Publication date: Sep. 2, 2015) involves in flat products made of metal sheet, in particular a steel material, useful use, a roll particularly suitable for the manufacture of such flat products, and method for producing such flat products. The technical solution disclosed in the patent document relates to a metal plate having specific surface texture and a manufacturing process thereof. The topography of the plate is obtained by rolling with a roll having a deterministic surface texture of double I-shape, H-shape, cross-shape, C-shape or X-shape, wherein the surface texture is characteristic in an RPc value in the range of from 45 to 180/cm, an Ra in the range of from 0.3 to 3.6 µm, and a Wsa in the range of from 0.05 to 0.65 µm. However, although the technical solutions disclosed in this patent document have optimized the surface microstructure to a certain extent, it does not significantly improve the lubricity of the surface of the material. Moreover, the regular surface topography is prone to "Moire" defects during painting.

That is, techniques for improving the surface lubrication and painting properties of materials by improving and controlling the surface microstructure of materials have not been found in the prior art.

SUMMARY OF THE INVENTION

The technical problem to be solved by the present invention is to provide a metal sheet having a low friction coefficient and a low waviness which can improve the forming and painting properties of materials.

The above technical problem can be solved by the following technical solutions.

A metal sheet having a low friction coefficient and a low waviness, wherein multiple round or roughly-round small pits are distributed on the surface of the metal sheet, the diameter of a single pit ranges from 30 µm to 150 µm, the overlap between adjacent pits is lower than 10%; and wherein on the surface of the metal sheet where the pits are located, the proportion of the surface area occupied by the pits per square millimeter is greater than 30%, the difference in the number of pits in any unit square millimeter is less than 20%.

The surface microstructure is designed to have a large number of tiny pits in order to form a plurality of "small oil pockets" on the surface of the material to store lubricating oil, thereby improving the stamping forming properties of the material. Moreover, the overlap between the pits is designed to be less than 10% in order to allow the pits to form "small oil pockets" independent of each other to hold lubricating oil, thereby avoiding the decrease in lubrication effect due to the flow of the lubricating oil between the pits.

The advantages of designing the shape of the pits as round or approximately round are that, on the one hand, the surface microstructure difference of the material on different directions can be avoided, and on the other hand, it is easier to keep the relative independence between the pits. The diameter of the pit is limited in a range from 30 to 150 µm for the following reasons: when the diameter of the pit is less than 30 the lubricating oil will be less likely to enter the pit and the manufacturing difficulty will be increased; when the diameter of the pit is more than 150 the surface microstructure will be too coarse, which will reduce the adhesion of the paint film, and the microstructure will not be easily covered by the paint film during coating, resulting in a decrease in paint performance.

Moreover, the proportion of the area occupied by the pits per square millimeter is limited to be more than 30% for the following reasons: if the proportion of the area occupied by the pits is less than 30%, the number of pits will be too small and the distribution of the pits will be too sparse, which may result in insufficient oil storage performance on the surface of the material and lowered adhesion between the paint film and the material. The difference in the number of pits in any unit square millimeter is designed to be less than 20% for the following reasons: the greater the difference in the number of pits in unit area, the worse the uniformity of the surface microstructure, the higher the waviness of the material surface, and the worse the painting performance after painting.

As a further improvement of the technical solution, the metal sheet is provided with the pits on one surface or both surfaces.

Also as a further improvement of the technical solution, the overlap between adjacent pits is lower than 5%. Preferably, the overlap between adjacent pits is 0.

Still as a further improvement of the technical solution, on the surface of the metal sheet where the pits are located, the proportion of the surface area occupied by the pits per square millimeter is greater than 50%.

Also as a further improvement of the technical solution, on the surface of the metal sheet where the pits are located, the difference in the number of pits in any unit square millimeter is less than 10%.

As a further improvement of the technical solution, on the surface of the metal sheet where the pits are located, the difference in the number of pits in any unit square millimeter is less than 5%.

In the metal sheet having a low friction coefficient and a low waviness according to the above technical solution, by means of the proper design of surface microstructure, the friction coefficient and the waviness are effectively reduced, thereby improving the forming and painting performance of the material.

DETAILED DESCRIPTION

Figure 1:
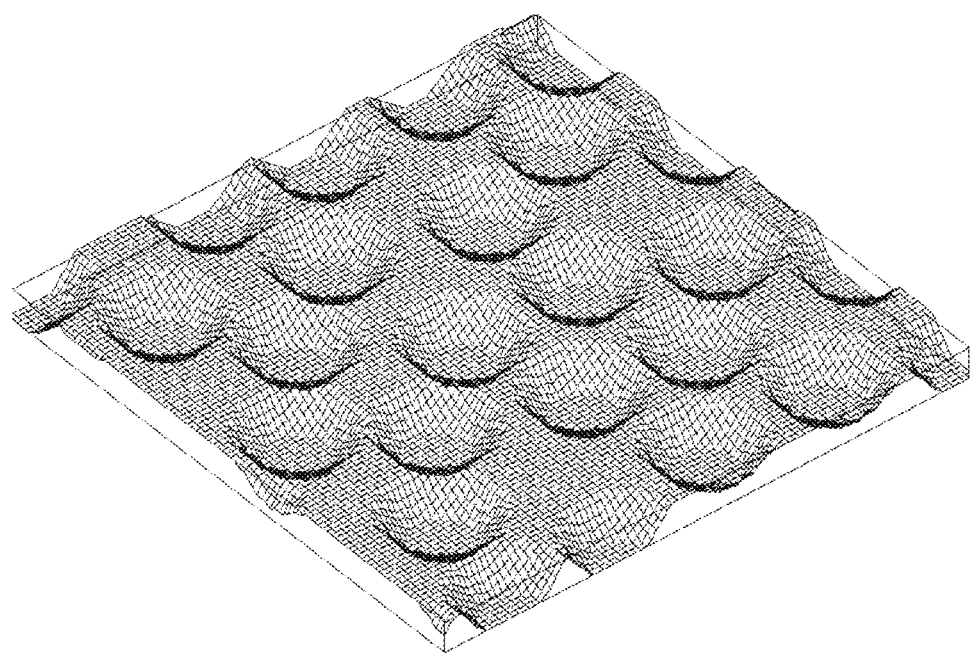
FIG. 1 shows the surface microstructure of the metal sheet of Example 1 of the present invention.
Figure 2:
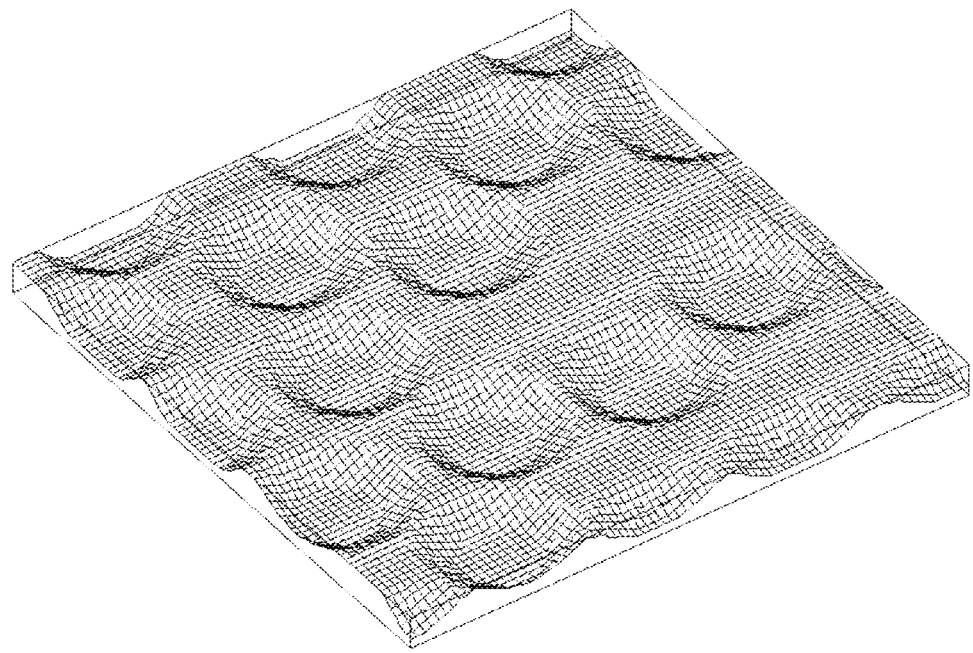
FIG. 2 shows the surface microstructure of the metal sheet of Example 2 of the present invention.
Figure 3:
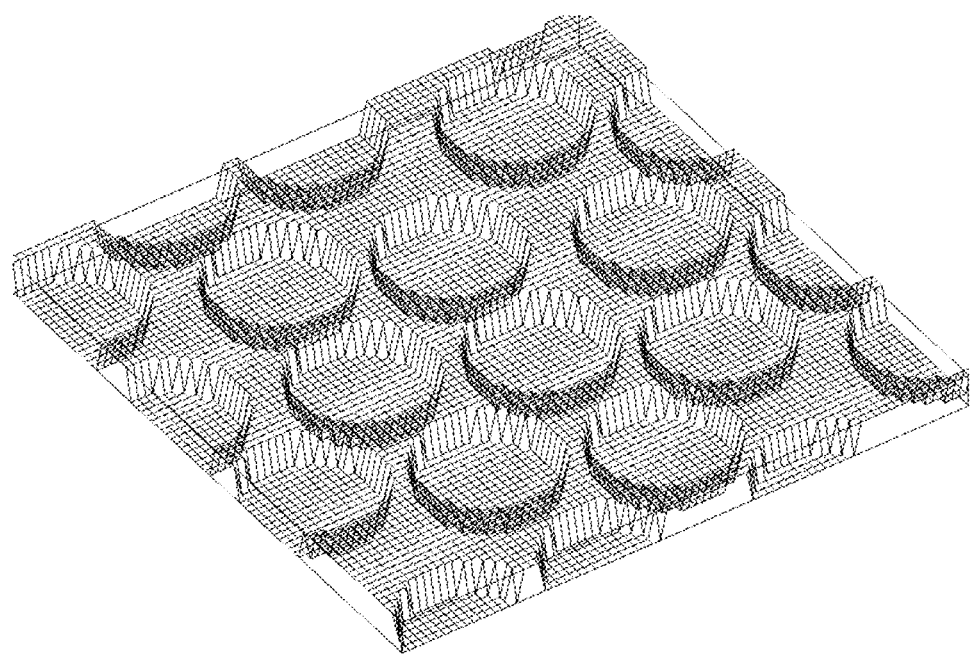
FIG. 3 shows the surface microstructure of the metal sheet of Example 3 of the present invention.
Figure 4:
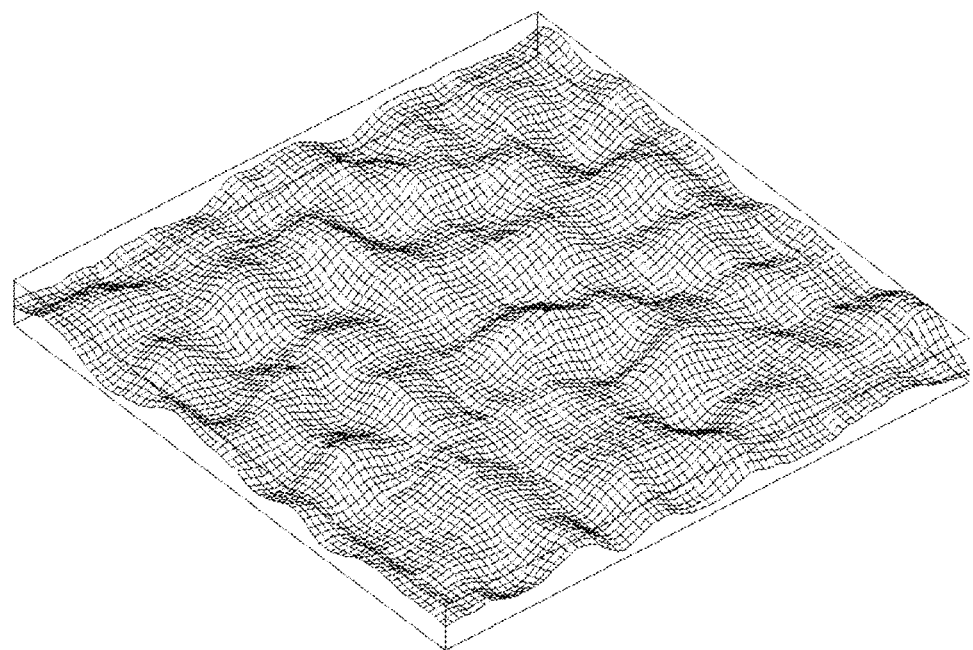
FIG. 4 shows the surface microstructure of the metal sheet of Comparative Example 1 of the present invention.
Figure 5:
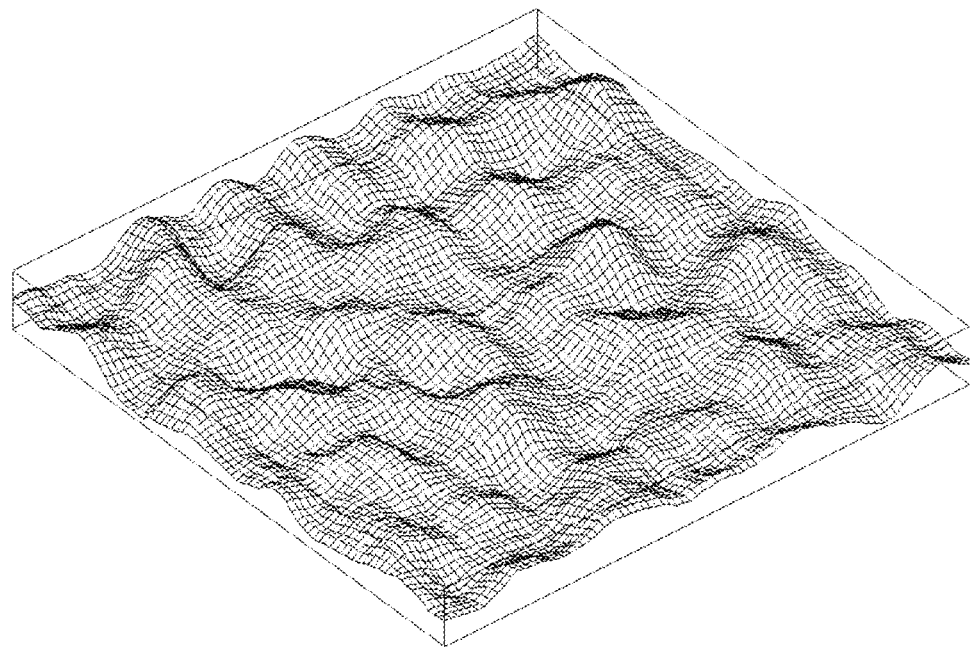
FIG. 5 shows the surface microstructure of the metal sheet of Comparative Example 2 of the present invention.
Figure 6:
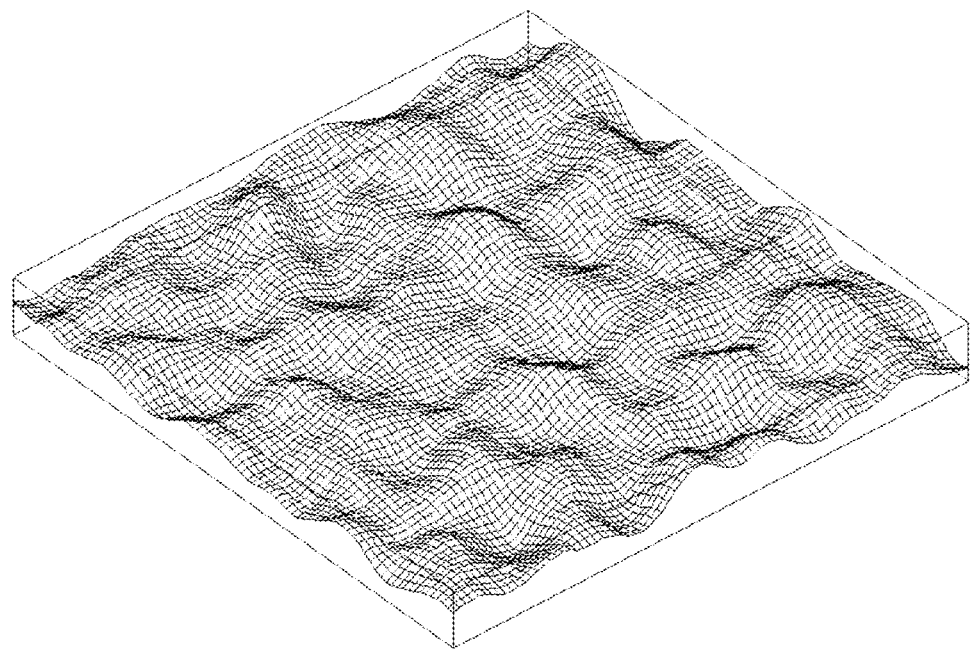
FIG. 6 shows the surface microstructure of the metal sheet of Comparative Example 3 of the present invention.

The specific embodiments of the present invention are further described in detail below with reference to the drawings and specific Examples.

It is an object of the present invention to provide a metal sheet having a low friction coefficient and a low waviness. By means of the proper design of surface microstructure, the friction coefficient and the waviness are effectively reduced, thereby improving the forming and painting performance of the material.

In order to achieve the above object, the present invention provides a metal sheet having a low friction coefficient and a low waviness, wherein the surface microstructure of the metal sheet has the following characteristics:

the surface microstructure consists of a large number of tiny pits; the overlap between adjacent pits is lower than 10%; the shape of the pits is round or roughly-round and the diameter of the pits is 30 to 150 μm; the proportion of the area occupied by the pits per square millimeter is greater than 30%; the difference in the number of pits in any unit square millimeter of the metal sheet is less than 20%.

That is, in order to improve the painting effect on the surface of the material, it is necessary to design the microscopic topography of the material surface so that the surface has as low a waviness as possible on the basis of a certain roughness.

The metal sheet having a low friction coefficient and a low waviness of the present invention is further explained and illustrated below with reference to the drawings and specific Examples and Comparative Examples. However, such explanations and illustrations do not unduly limit the technical solution of the present invention.

Examples 1-3 and Comparative Examples 1-3

Examples 1-3 are hot-dip galvanized steel sheets having a surface microstructure which has the technical features of the present invention, and Comparative Examples 1-3 are hot-dip galvanized steel sheets having a common surface. The specific surface microstructure parameters of Examples and Comparative Examples are shown in Table 1 below. Since the microstructure of the Comparative Examples has random undulations, it is difficult to accurately distinguish the bosses and the pits. Therefore, it is difficult to obtain the statistics of the pit diameter, the number of pits and the proportion of the pit area for the Comparative Examples. FIGS. 1-6 correspond to the surface microstructures of Examples 1-3 and Comparative Examples 1-3, respectively.

TABLE 1

|  | Microstructure | Pit shape | Pit diameter | Proportion of pit area | Number of pits |
|---|---|---|---|---|---|
| Example 1 | Distributed pits | Round | About 80 μm | 60% | 130/mm$^2$ |
| Example 2 | Distributed pits | Round | About 100 μm | 62% | 110/mm$^2$ |

TABLE 1-continued

|  | Microstructure | Pit shape | Pit diameter | Proportion of pit area | Number of pits |
|---|---|---|---|---|---|
| Example 3 | Distributed pits | Round | About 100 μm | 71% | 90/mm² |
| Comparative Example 1 | Random undulations | Irregular | — | — | — |
| Comparative Example 2 | Random undulations | Irregular | — | — | — |
| Comparative Example 3 | Random undulations | Irregular | — | — | — |

Figure 7:
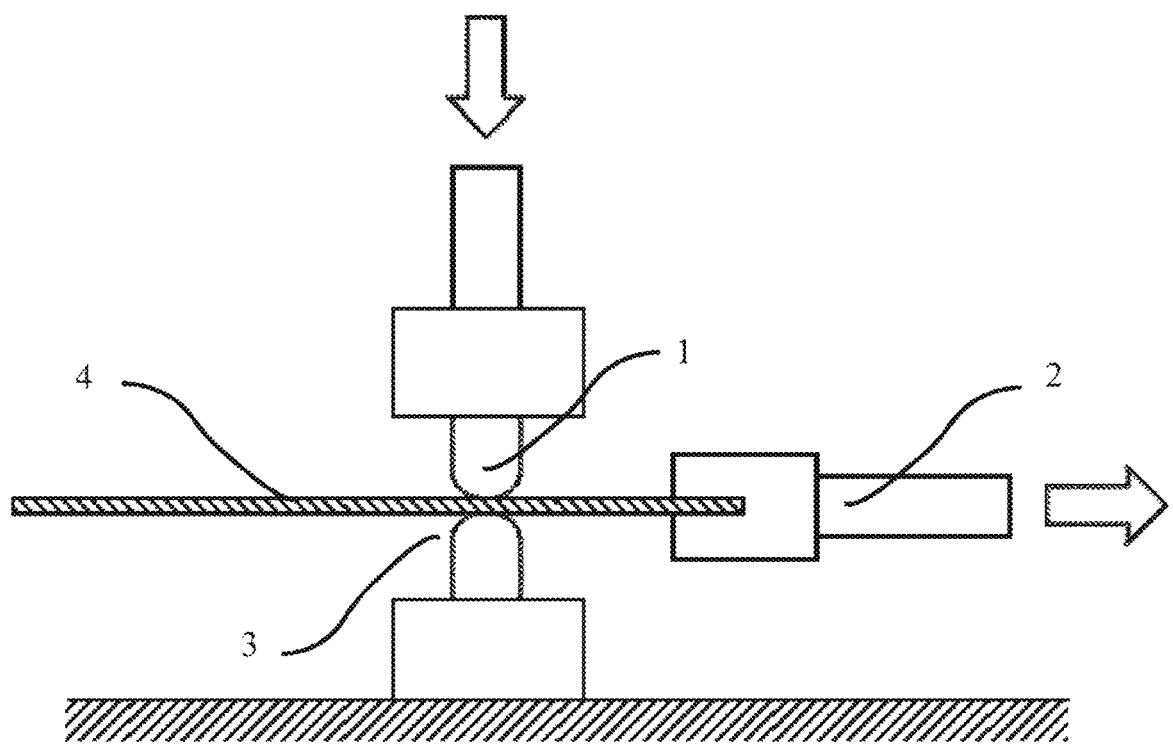
FIG. 7 shows the structure diagram of a drawbead tester for measuring the friction coefficient. The meanings of the symbols in FIG. 7 are: 1—upper head, 2—drawing arm, 3—lower head, 4—sample.

The roughness and waviness of Examples 1 to 3 and Comparative Examples 1 to 3 were tested in accordance with the measurement standard ISO 4287:1997. Gaussian filter was used as the filter. The sampling length was 0.8 mm for the roughness Ra and 40 mm for the waviness Wa. The filtering interval was 0.8 to 8 mm. Then, the friction coefficients of Examples 1 to 3 and Comparative Examples 1 to 3 were measured using the drawbead tester shown in FIG. 7 and compared. Specific test parameters were as follows: sample 4 was placed between the upper head 1 and the lower head 3, the pressure of the upper head 1 was 1500 N; drawing arm 2 drew sample 4 at a speed of 150 mm/min and the drawing distance was 100 mm; the size of the sample 4 was 25×400 mm for all cases, and the amount of oil applied to the sample was 1.0 g/m². As shown in Table 1, the number of pits in Examples 1-3 of the present application are 130/mm², 110/mm², and 90/mm², respectively, such that the number of pits is in a range from 90/mm² to 130/mm².

The data of the test results listed in Table 2 below shows that Examples 1 to 3 having the microscopic surface topography of the material which has the technical features of the present invention have a significantly lower friction coefficient and waviness than Comparative Examples 1-3.

TABLE 2

|  | Example 1 | Example 2 | Example 3 | Comparative Example 1 | Comparative Example 2 | Comparative Example 3 |
|---|---|---|---|---|---|---|
| Roughness | 1.02 μm | 1.06 μm | 0.98 μm | 1.03 μm | 1.02 μm | 0.96 μm |
| Waviness | 0.183 μm | 0.193 μm | 0.211 μm | 0.246 μm | 0.235 μm | 0.251 μm |
| Friction coefficient | 0.119 | 0.112 | 0.121 | 0.130 | 0.127 | 0.132 |

It should be noted that the above listed examples are merely specific embodiments of the invention. It is obvious that the present invention is not limited to the above Examples. Instead, there are many similar variations. All variations that are directly derived or conceived by those skilled in the art from this disclosure of the invention are intended to be within the scope of the present invention.

The invention claimed is:

1. A metal sheet having a low friction coefficient and a low waviness, wherein multiple round or roughly-round pits are distributed on a surface of the metal sheet, a diameter of each of the pits ranges from 80 μm to 100 μm, and an overlap between adjacent pits is lower than 10% of an area of the adjacent pits,
wherein on the surface of the metal sheet where the pits are located, a proportion of a surface area occupied by the pits per square millimeter ranges from 60% to 71%,
wherein on the surface of the metal sheet where the pits are located, a difference in a number of pits per square millimeter between any two unit square millimeter areas is less than 20%, and
wherein on the surface of the metal sheet where the pits are located, a number of pits is in a range from 90 per square millimeter to 130 per square millimeter.

2. The metal sheet having the low friction coefficient and the low waviness as claimed in claim 1, wherein the surface extends on opposing sides of the metal sheet.

3. The metal sheet having the low friction coefficient and the low waviness as claimed in claim 1, wherein the overlap between the adjacent pits is lower than 5% of the area of the adjacent pits.

4. The metal sheet having the low friction coefficient and the low waviness as claimed in claim 1, wherein the overlap between the adjacent pits is 0% of the area of the adjacent pits.

5. The metal sheet having the low friction coefficient and the low waviness as claimed in claim 1, wherein on the surface of the metal sheet where the pits are located, the difference in the number of the pits per square millimeter between any two unit square millimeter areas is less than 10%.

6. The metal sheet having the low friction coefficient and the low waviness as claimed in claim 5, wherein on the surface of the metal sheet where the pits are located, the difference in the number of the pits per square millimeter between any two unit square millimeter areas is less than 5%.

* * * * *